(12) United States Patent
Wentz et al.

(10) Patent No.: US 7,712,623 B2
(45) Date of Patent: May 11, 2010

(54) RECEPTACLE WITH VENT

(75) Inventors: Ashley P. Z. Wentz, Winchester, VA (US); A. Reneau Van Landingham, Steven's City, VA (US); Thomas A. Ruckman, Winchester, VA (US)

(73) Assignee: Rubbermaid Commercial Products LLC, Winchester, VA (US)

( * ) Notice: Subject to any disclaimer, the term of this patent is extended or adjusted under 35 U.S.C. 154(b) by 253 days.

(21) Appl. No.: 11/702,532

(22) Filed: Feb. 6, 2007

(65) Prior Publication Data

US 2007/0210088 A1    Sep. 13, 2007

Related U.S. Application Data

(60) Provisional application No. 60/848,992, filed on Oct. 4, 2006, provisional application No. 60/765,160, filed on Feb. 6, 2006.

(51) Int. Cl.
   *B65D 25/14* (2006.01)
   *B65D 35/20* (2006.01)
(52) U.S. Cl. .................. 220/495.04; 220/669
(58) Field of Classification Search ............ 220/495.04, 220/669, 908.1, 501, 671; 206/519, 520
   See application file for complete search history.

(56) References Cited

U.S. PATENT DOCUMENTS

| | | | |
|---|---|---|---|
| 3,096,960 A | 7/1963 | Kinney | |
| 3,269,550 A | 8/1966 | Marcus | |
| 3,434,625 A * | 3/1969 | Embry, Jr. | 220/495.06 |
| 3,561,077 A | 2/1971 | Grant | |
| 3,568,879 A | 3/1971 | Box | |
| 3,759,416 A * | 9/1973 | Constantine | 206/505 |
| 3,784,049 A | 1/1974 | Hawk | |
| 3,825,150 A | 7/1974 | Taylor | |
| 3,937,355 A | 2/1976 | Engebretsen | |
| 4,027,774 A | 6/1977 | Cote | |
| 4,267,995 A | 5/1981 | McMillan | |
| 4,294,379 A | 10/1981 | Bard | |
| 4,570,304 A | 2/1986 | Montreuil et al. | |
| 4,576,310 A | 3/1986 | Isgar et al. | |
| 4,589,570 A | 5/1986 | Auten | |

(Continued)

FOREIGN PATENT DOCUMENTS

EP    0 728 436 A1    8/1996

(Continued)

OTHER PUBLICATIONS

EPO Office Action dated Jan. 20, 2009—Application No. 07 763 479.8-1261.

(Continued)

*Primary Examiner*—Anthony Stashick
*Assistant Examiner*—Harry A Grosso
(74) *Attorney, Agent, or Firm*—Foley & Lardner LLP (57) ABSTRACT

The present trash receptacle (and method for using the same) reduces the suction/vacuum effect in the bottom portion of the receptacle as trash bags or polyliners are removed therefrom. The receptacle includes a vent enabling fluid communication from a first chamber section (at the bottom of the receptacle) to a second chamber section which rests above the first chamber section.

21 Claims, 9 Drawing Sheets

U.S. PATENT DOCUMENTS

| | | |
|---|---|---|
| 4,610,039 A | 9/1986 | Stern |
| 4,631,783 A | 12/1986 | Hayashi |
| 4,644,610 A | 2/1987 | Fish |
| 4,715,572 A | 12/1987 | Robbins, III et al. |
| 4,765,579 A | 8/1988 | Robbins, III et al. |
| 4,852,844 A | 8/1989 | Villaveces |
| 4,923,087 A | 5/1990 | Burrows |
| 4,955,496 A | 9/1990 | Nelson |
| 5,031,796 A | 7/1991 | Schäfer et al. |
| 5,036,999 A | 8/1991 | Bitsch |
| 5,111,938 A | 5/1992 | Soprano et al. |
| 5,205,530 A | 4/1993 | Fish |
| 5,261,553 A | 11/1993 | Mueller et al. |
| 5,269,434 A | 12/1993 | Labuda |
| 5,271,589 A | 12/1993 | Belous |
| D343,752 S | 2/1994 | Corbin |
| 5,307,585 A | 5/1994 | Thompson |
| 5,358,138 A | 10/1994 | Karwoski |
| 5,375,732 A | 12/1994 | Bowers et al. |
| 5,419,452 A | 5/1995 | Mueller |
| 5,492,241 A | 2/1996 | Barnett et al. |
| 5,518,137 A | 5/1996 | Hayes |
| 5,636,416 A | 6/1997 | Anderson |
| 5,695,088 A | 12/1997 | Kasbohm |
| 5,706,544 A | 1/1998 | Young |
| D401,383 S | 11/1998 | Gish |
| 5,911,335 A | 6/1999 | Baumann |
| 6,000,571 A | 12/1999 | Brooks et al. |
| 6,223,927 B1 | 5/2001 | Rand |
| 6,237,775 B1 | 5/2001 | Hatch et al. |
| 6,286,706 B1 | 9/2001 | Tucker |
| 6,474,495 B1 | 11/2002 | Frei |
| 6,581,796 B1 | 6/2003 | Pilkinton |
| 6,634,518 B1 | 10/2003 | Jones |
| 7,185,783 B1 * | 3/2007 | Miller ..................... 220/675 |
| 2004/0045974 A1 * | 3/2004 | Gruber et al. ............... 220/669 |

FOREIGN PATENT DOCUMENTS

| | | |
|---|---|---|
| GB | 2 298 128 | 8/1996 |

OTHER PUBLICATIONS

EPO Office Action dated Jan. 20, 2009—Application No. 07 763 356.8-1261.

International Written Opinion of International Searching Authority for PCT/US/2007/003234 dated Jun. 12, 2007.

Written Opinion of the International Preliminary Examining Authority for PCT/US2007/003234 dated Feb. 25, 2008.

PCT International Preliminary Report on Patentability for PCT/US2007/003234 dated May 29, 2008.

PCT International Search Report and Written Opinion of the International Searching Authority for PCT/US2007/003235 dated Feb. 16, 2007.

PCT International Preliminary Report on Patentability for PCT/US2007/003235 dated Feb. 11, 2008.

U.S. PTO Office Action, U.S. Appl. No. 11/702,528, dated Jul. 7, 2009, 14 pages.

* cited by examiner

Fig. 14

RECEPTACLE WITH VENT

CROSS-REFERENCE TO RELATED APPLICATIONS

This application claims priority to U.S. Provisional Application Nos. 60/765,160 (filed Feb. 6, 2006) and 60/848,992 (filed Oct. 4, 2006), which are incorporated herein by reference in their entirety.

TECHNICAL FIELD

The invention relates to a receptacle with a vent and, more particularly, to a receptacle for trash having a vent that provides fluid communication with a bottom area of the receptacle.

BACKGROUND

Receptacles or containers for refuse have a variety of useful applications and are available in a number of different sizes. For example, large receptacles (e.g., 44 or 55 gallon receptacles) are commonly used for disposal of trash, grass, leaves, and other materials. Liners are often used in combination with the receptacles to simplify emptying of the receptacles and disposal/transportation of the filled liner.

Many liners are composed of an elastic or deformable material (e.g., polyliner or trash bags) that will conform to the shape of the receptacle. This can cause the liner to conform to the sides of the receptacle during removal, thereby forming a seal and preventing air from passing through to the bottom portion of the receptacle. This seal can create a vacuum or suction effect in the bottom portion of the receptacle as the liner is removed. Thus, as an example, when removing a liner containing dense materials from a larger receptacle, the vacuum may add significantly to the strain suffered by the user.

It is desirable to ventilate the bottom portion of the receptacle so that air can flow into the bottom portion during removal of the liner and prevent or release a vacuum. There is a need to provide an economical way of reducing or minimizing the force required to fully remove the liner from the receptacle without sacrificing the utility or structural integrity of the receptacle.

SUMMARY

In one exemplary embodiment, a receptacle includes a first chamber section configured to receive items. The first chamber section has a first side wall and a bottom wall. A second chamber section is located above the first chamber section. The second chamber section has a, second side wall and an internal width that is wider than an internal width of the first chamber section. A vent provides fluid communication between the second chamber section and a bottom area of the first chamber section.

In another exemplary embodiment, a receptacle configured to receive a liner includes a bottom wall and a first chamber section at least partially defined by the bottom wall and a side wall. A second chamber section is superjacent the first chamber section and at least partially defined by the side wall and a rim. A vent is configured to reduce negative pressure in the first chamber section as the liner is filled and/or removed from the receptacle. The second chamber section has a wider internal width than an internal width of the first chamber section.

In another exemplary embodiment a method of using a receptacle with a liner includes: pulling the liner from a first chamber section of the receptacle that is configured to receive items, the first chamber section having a bottom wall and a first side wall with a vent; and pulling the liner from a second chamber section of the receptacle that is located above the first chamber section. The second chamber section has a second side wall and an internal width that is wider than an internal width of the first chamber section. The liner is pulled from the first chamber section such that the vent provides fluid communication between the second chamber and a bottom area of the first chamber section.

BRIEF DESCRIPTION OF THE DRAWINGS

The accompanying drawings, which are incorporated in and constitute a part of this specification, illustrate preferred embodiments of the invention and together with the description serve to explain principles of the invention.

DETAILED DESCRIPTION

Presently preferred embodiments of the invention are illustrated in the drawings. An effort has been made to use the same or like reference numbers throughout the drawings to refer to the same or like parts. With reference to the exemplary embodiments shown in FIGS. 1-14, the construction and use of a receptacle is described herein.

Figure 1:
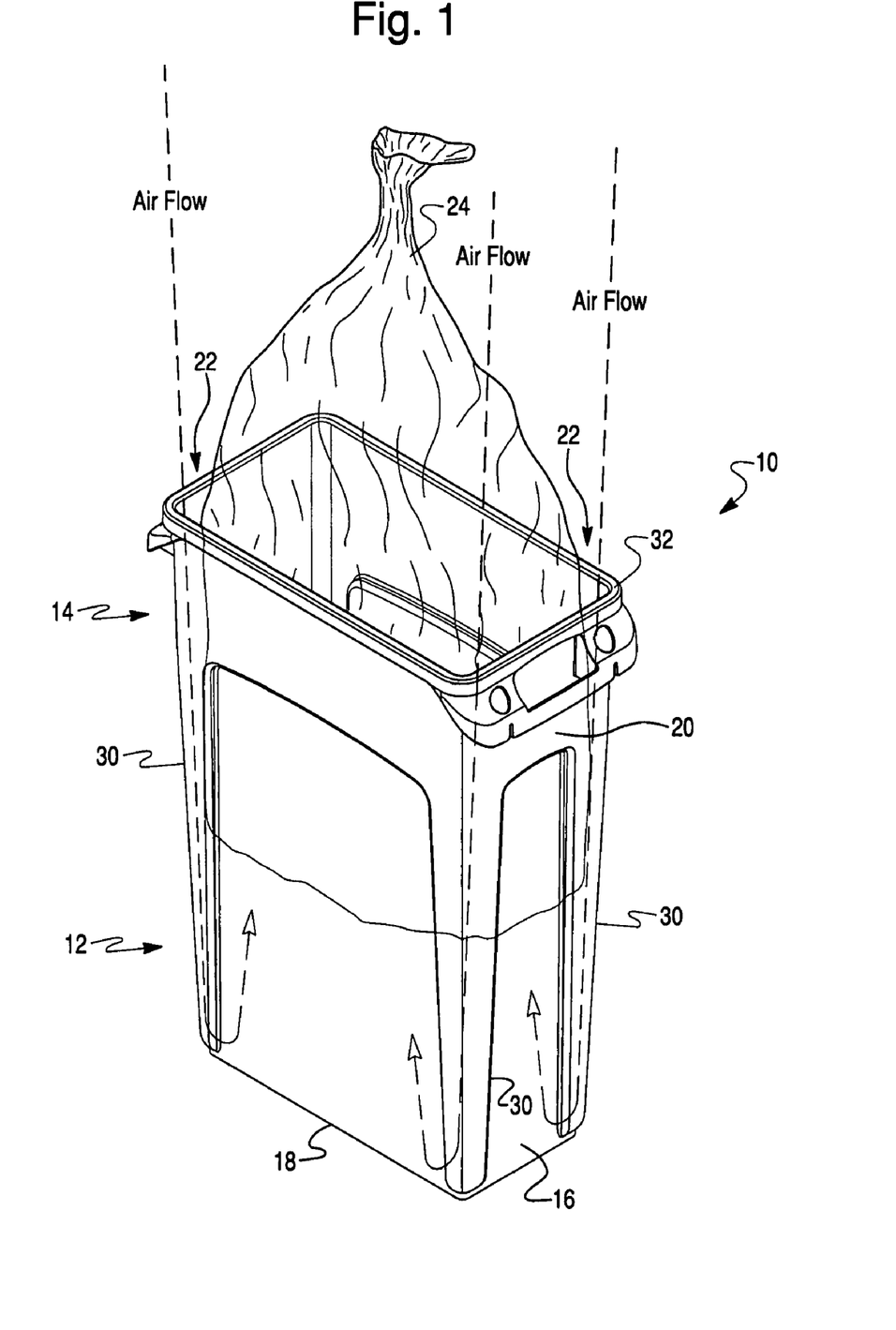
FIG. 1 is a perspective view of a preferred embodiment of a receptacle according to the present invention.

FIG. 1 shows an embodiment of a receptacle 10 according to the present invention. In this embodiment, the receptacle includes a first chamber section 12, a second chamber section 14, and a vent 22. The receptacle 10 can be configured to receive items (e.g., a liner 24, another receptacle or other members).

Figure 14:
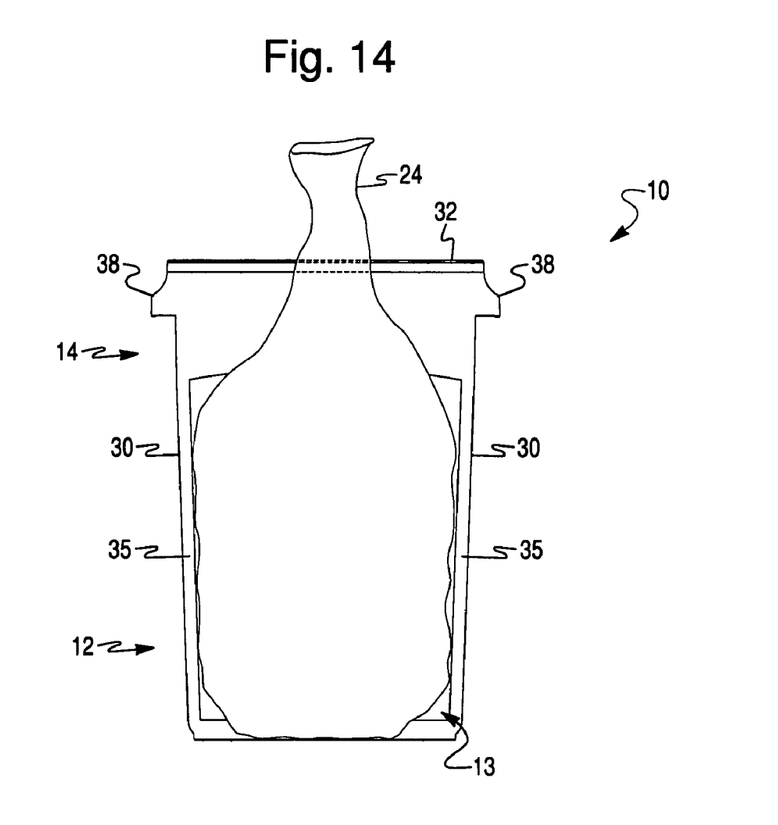
FIG. 14 is cross-sectional view of the receptacle taken from line B-B in FIG. 6.

The first chamber section 12 is defined by a side wall 16 and a bottom wall 18 (also shown in FIGS. 2-6). The side wall 16 can be formed, for example, with a plurality of side wall portions 16a, 16b, 16c, and 16d. The first chamber section 12 has a bottom area 13. As shown in FIG. 14, the bottom area 13 is a location at which a vacuum may form in the absence of the vent 22.

The second chamber section 14 is located above (or superjacent) the first chamber section 12. The second chamber section 14 is defined by side wall 20. The side wall 20 can be formed, for example, of a plurality of side wall portions 20a, 20b, 20c, and 20d as shown in FIGS. 2-3.

The vent 22 provides fluid communication between the second chamber section and the bottom area 13 of the first chamber section 12. The vent 22 inhibits the build-up of a vacuum and thus reduces negative pressure in the bottom portion 13 of the first chamber section 12 as the liner 24 is removed from the receptacle 10.

The vent 22 can be formed, for example, by a series of outward protrusions 30 at each of the four corners of the receptacle 10, i.e., at the locations where the side wall portions 16a, 16b, 16c, and 16d meet. The outward protrusions 30 preferably run vertically up the side of the receptacle 10. The outward protrusions 30 form airways or channels that enable air to flow from the second chamber section 14 to the first chamber section 12. Outward protrusions 30 are designed to have a relatively small volume as compared to the first and second chamber sections 12, 14. Specifically, the outward protrusions 30 are designed to have a depth and width that does not easily allow a filled liner (e.g., 24) to seep into the inner cavity of the protrusions and block the vents as discussed hereinbelow. Though the vent 22 is preferably formed by outward protrusions 30, it is possible for the vent 22 to be formed by inward protrusions (not shown).

Figure 2:
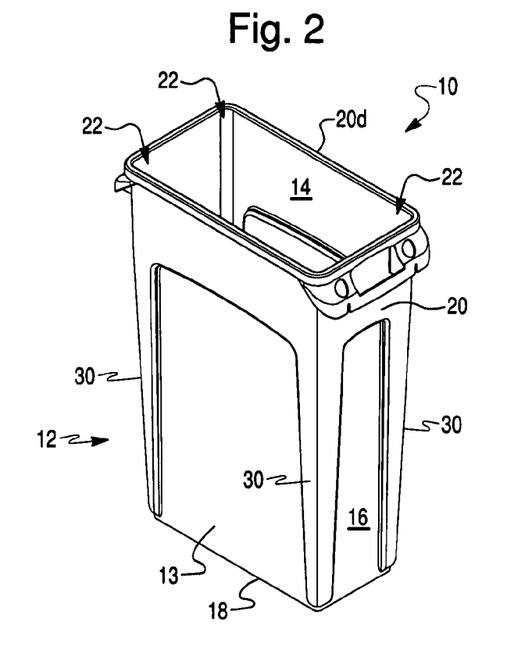
FIG. 2 is a perspective view of the receptacle of FIG. 1.
Figure 3:
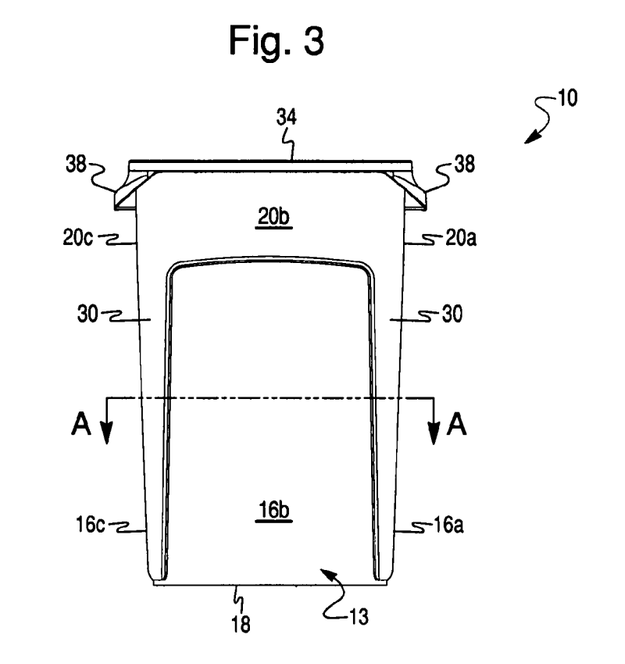
FIG. 3 is a front view of the receptacle of FIG. 1.

As shown in FIG. 2, for example, the outward protrusions 30 preferably have a variable internal width. For example, the internal width of the protrusion 30 at the bottom of the receptacle 10 can be smaller than the internal width at the top of the receptacle. In this way, the vent 22 is able to provide air to the bottom portion 13 of the receptacle 10 while allowing the receptacle 10 to be formed with cost effective tooling.

Figure 13:
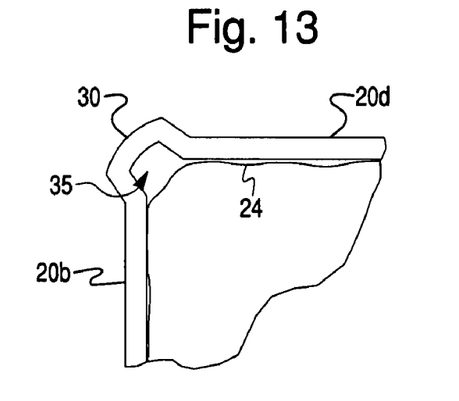
FIG. 13 is a cross-sectional view of the receptacle taken from line A-A in FIG. 3.

As shown in FIG. 13 a cross-sectional view of the receptacle 10 taken from line A-A in FIG. 3 is shown. The protrusions 30 preferably have a width that is sufficient to prevent the liner 24 from filling the air passage 35 defined by the protrusions. For example, in a preferred embodiment conforming substantially to the dimensions of a conventional SLIM JIM container (about 23 inches long, about 11 inches wide, and about 30 inches high), the internal width of the air passage tapers from about 1 to 2 inches (more preferably about 1.5 inches) at the bottom to about 2.5 to 3.5 inches (more preferably about 2.9 inches) at the top, and its depth is about 0.25 to about 0.75 inches (more preferably about 0.5 inches). As shown in FIG. 14, air in the bottom area 13 of the receptacle is able to pass the liner 24 when the liner 24 is being removed from the receptacle.

Outward protrusions 30 may be formed or included in the receptacle 10 utilizing a number of manufacturing methods. For example, the mold for the present receptacle 10 can include indentations for the outward protrusions 30. In this way, the receptacle 10 with vents 22 can be manufactured without a significant increase in tooling costs or material costs.

Figure 9:
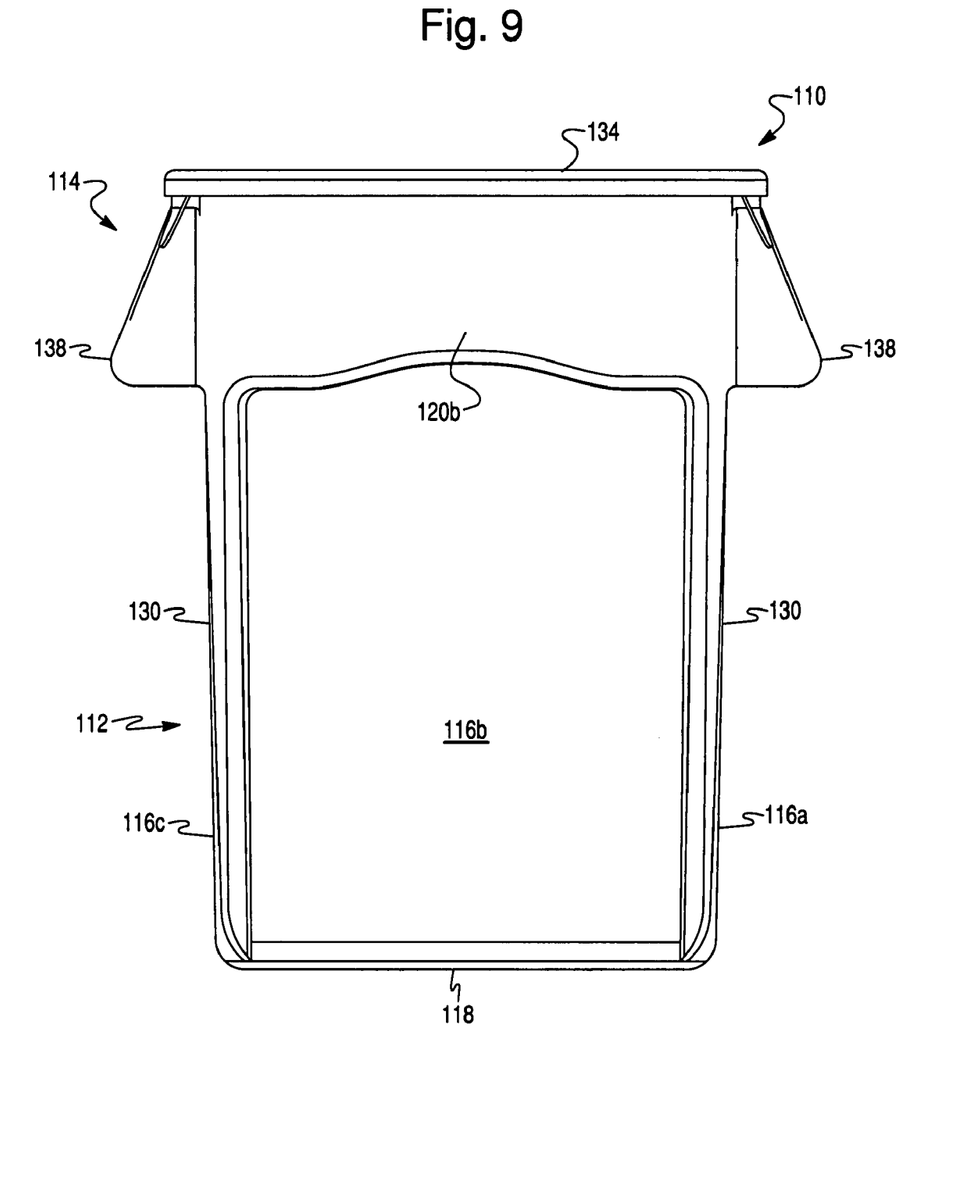
FIG. 9 is a front view of the receptacle of FIG. 7.
Figure 10:
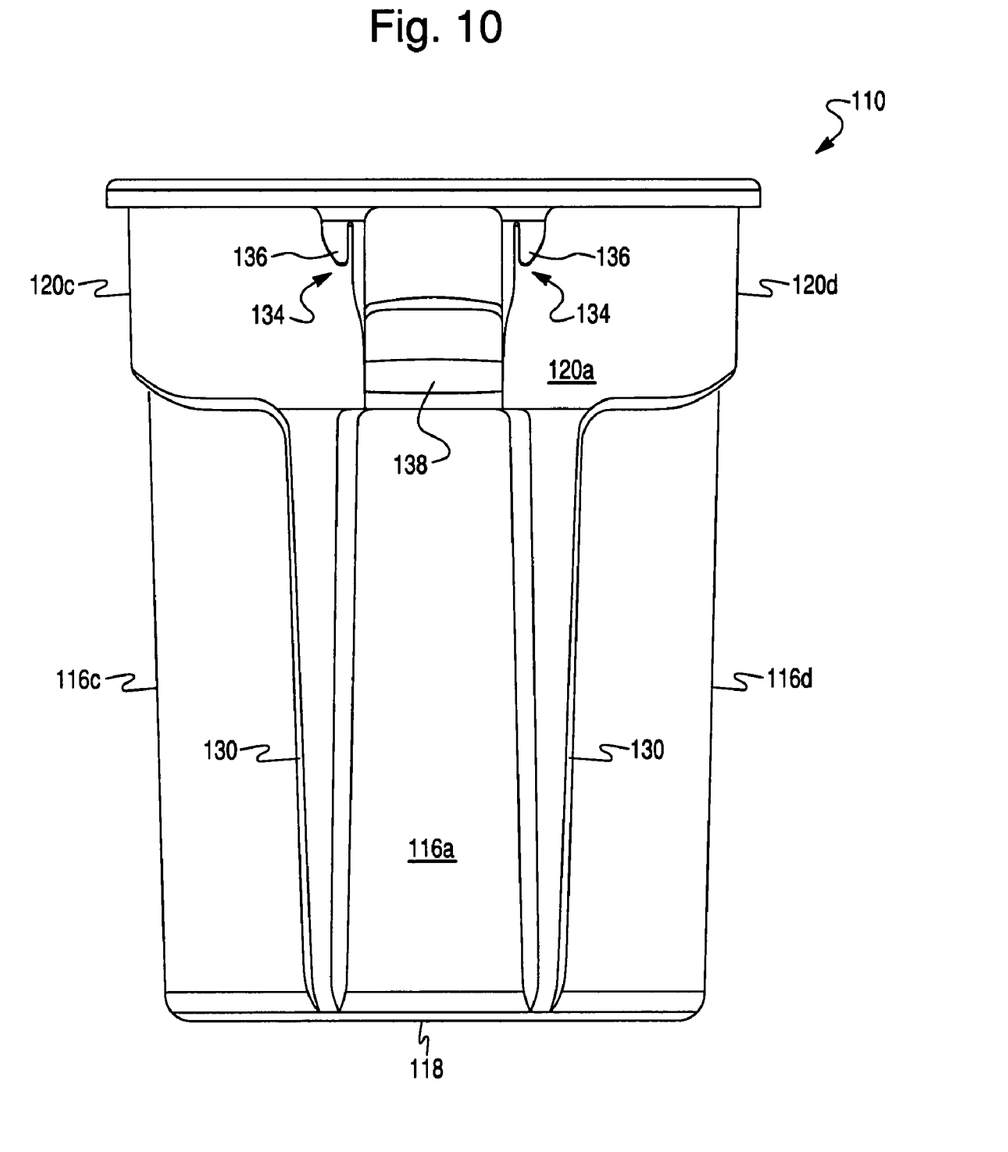
FIG. 10 is a side view of the receptacle of FIG. 7.
Figure 11:
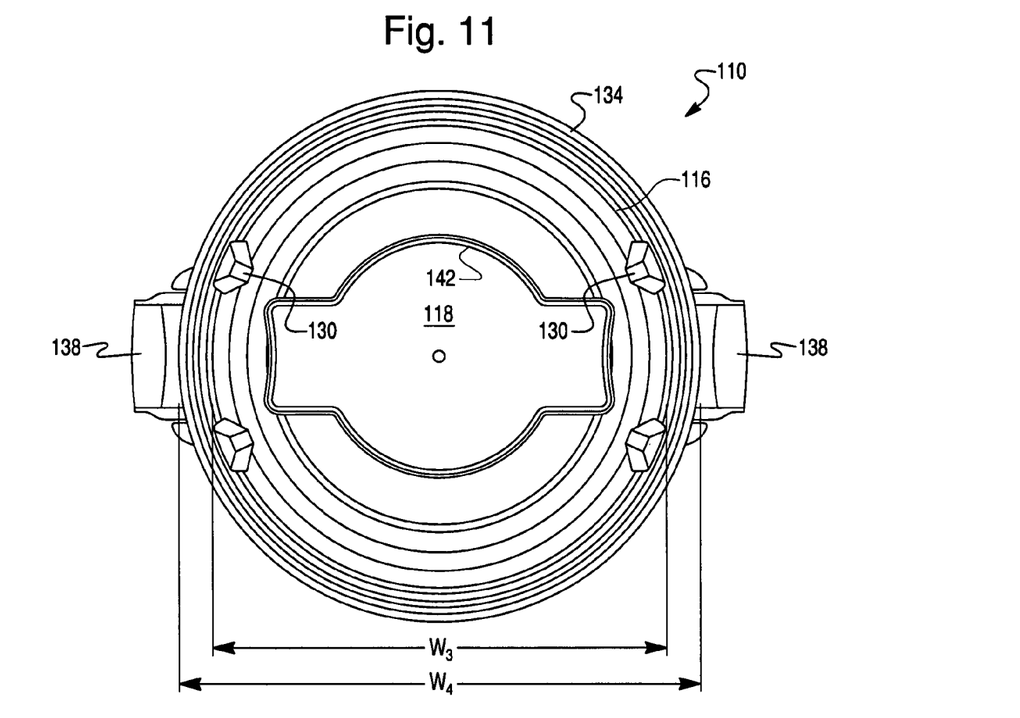
FIG. 11 is a top view of the receptacle of FIG. 7.
Figure 12:
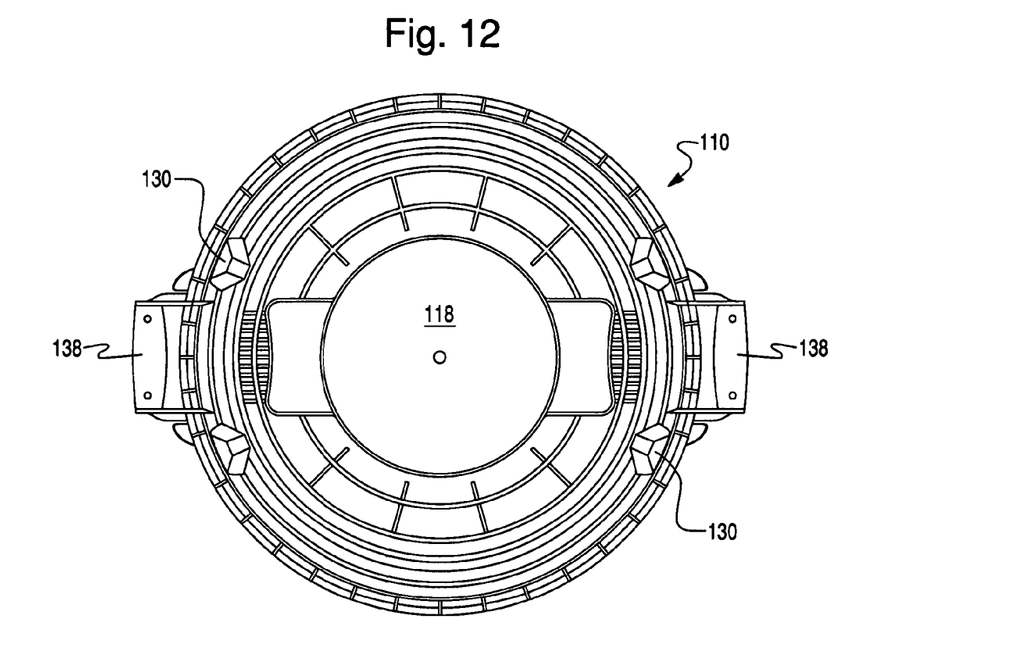
FIG. 12 is a bottom view of the receptacle of FIG. 7.

Another exemplary embodiment of a receptacle 110 according to the present invention is shown in FIGS. 7-12. Like the previously described embodiment, this receptacle 110 includes a first chamber section 112 defined by a side wall 116 and a bottom wall 118, a second chamber section 114 defined by a side wall 120, and a vent 122 that reduces negative pressure in a bottom portion 113 (as shown in FIG. 14) of the first chamber section 112 as a liner 124 is removed. As shown in FIGS. 9-10, side wall 116 is formed with side wall portions 116a, 116b, 116c and 116d. Side wall 120 is formed with side wall 120a, 120b, 120c, and 120d. The vent 122 can be formed by a plurality of outward protrusions 130. The protrusions 130 preferably have a width that is sufficient to prevent the liner 124 from filling the air passage 135 defined by the protrusions. For example, in a preferred embodiment conforming substantially to the dimensions of a conventional 44 gallon BRUTE container (about 24 inches in diameter at the top and about 31 inches high), the internal width of the air passage tapers from about 1 to 1.5 inches (more preferably about 1.2 inches) at the bottom to about 2 to 3 inches (more preferably about 2.5 inches) at the top, and its depth is about 0.3 to about 0.9 inches (more preferably about 0.66 inches). Preferably the structures in the receptacle 110 are configured to perform in a manner like those described for receptacle 10. In addition, the bottom wall 118 can include ribs 142, as shown in FIG. 11, that increase the spacing between liner 124 and the bottom wall 118 of the receptacle 110, and thereby enhance fluid flow.

In each embodiment, a rim 32, 132 is provided at the top of the receptacle 10, 110. Rim 32, 132 includes a handle portion 38, 138 in which the receptacle 10, 110 may be hand-carried.

Figure 4:
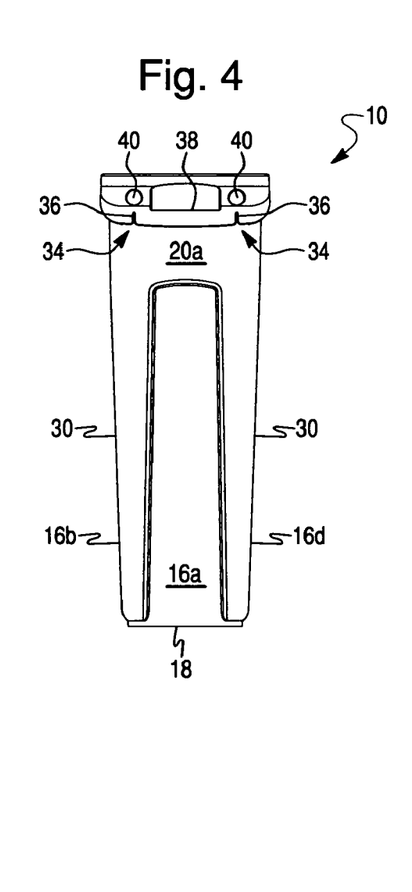
FIG. 4 is a side view of the receptacle of FIG. 1.

Cinching mechanisms 34, 134 (as shown in FIGS. 4 and 10) can be incorporated into the receptacle 10, 110. The cinching mechanism 34, 134 can include slots 36, 136 on the handle portion 38, 183. The slots 36, 136 are included to bunch the liner 24, 124 (as shown in FIGS. 1, 7 and 13-14) therein and hold it in place. Four slots 36, 136 are included in the handle portion 38, 138 providing four anchors, one or more of which can be used to fixedly locate the liner 24, 124 with respect to the receptacle 10, 110. Apertures 40 also may be provided. The cinching mechanism is described in more detail in concurrently filed U.S. patent application Ser. No. 11/702,528, entitled Receptacle With Cinch, which is hereby incorporated by reference in its entirety.

The shape of the receptacle 10, 110 can be configured based on the desired application. In the embodiment shown in FIGS. 1-6 and 13-14, the receptacle 10 preferably has a substantially rectangular cross-sectional shape. Accordingly, in this embodiment, the first and second chamber sections 12, 14 preferably have substantially rectangular cross sectional shapes. In the embodiment shown in FIGS. 7-12, the receptacle 110 preferably has a substantially circular cross-sectional shape. Accordingly, in this embodiment, the first and second chamber sections 112, 114 preferably have substantially circular cross sectional shapes.

Figure 5:
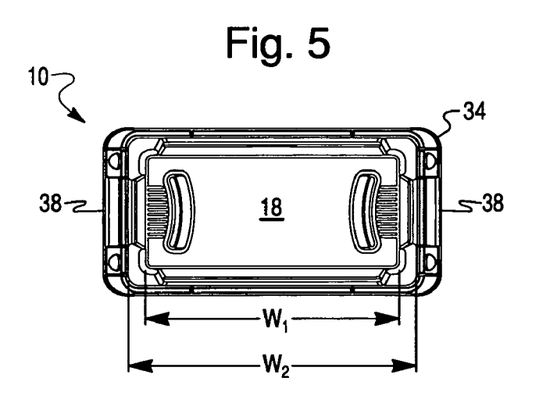
FIG. 5 is atop view of the receptacle of FIG. 1.
Figure 6:
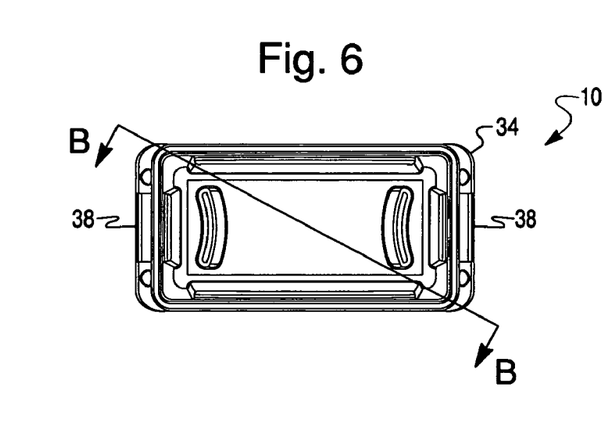
FIG. 6 is a bottom view of the receptacle of FIG. 1.

In both embodiments, the second chamber section 14, 114 preferably has a greater width than the first chamber section 12, 112, which enhances rigidity of the receptacle 10, 10 and permits easier removal of the liner 24 as it nears the top of the receptacle 10, 110. In particular, the first chamber section 12, 112 has an internal width w1, w3 and the second chamber section 14, 114 has an internal width w2, w4, as shown in FIGS. 5 and 11. Preferably the internal width w2, w4 of the second chamber section 14, 114 is wider than the internal width w1, w3 of the first chamber section 12, 112. Though the width w1, w3 of the first chamber section 12, 112 may increase from the bottom wall 18, 118 to the second chamber section 14, 114, still the width of the first chamber section 12, 112 measured from any point is preferably smaller than the width of the second chamber section 14, 114 measured from any point.

The receptacle 10, 110 is preferably configured to fit at least 50% of a substantially similarly shaped receptacle in a vertical direction in a nesting relationship. Configuring the receptacle to be able to nest in this fashion provides distinct advantages, such as reduced space needed for shipping.

The receptacle 10, 110 may be composed of any acceptable material, including those known within the art. For example, the receptacle may be composed of a polymer. The receptacle 10, 110 can be formed by suitable processes, such as injection molding, which are known in the art.

The liner 24, 124 may be composed of any number of materials including an elastic material (e.g., a polymer). The liner 24, 124 preferably is configured to substantially conform to the shape of the receptacle 10, 110.

Figure 7:
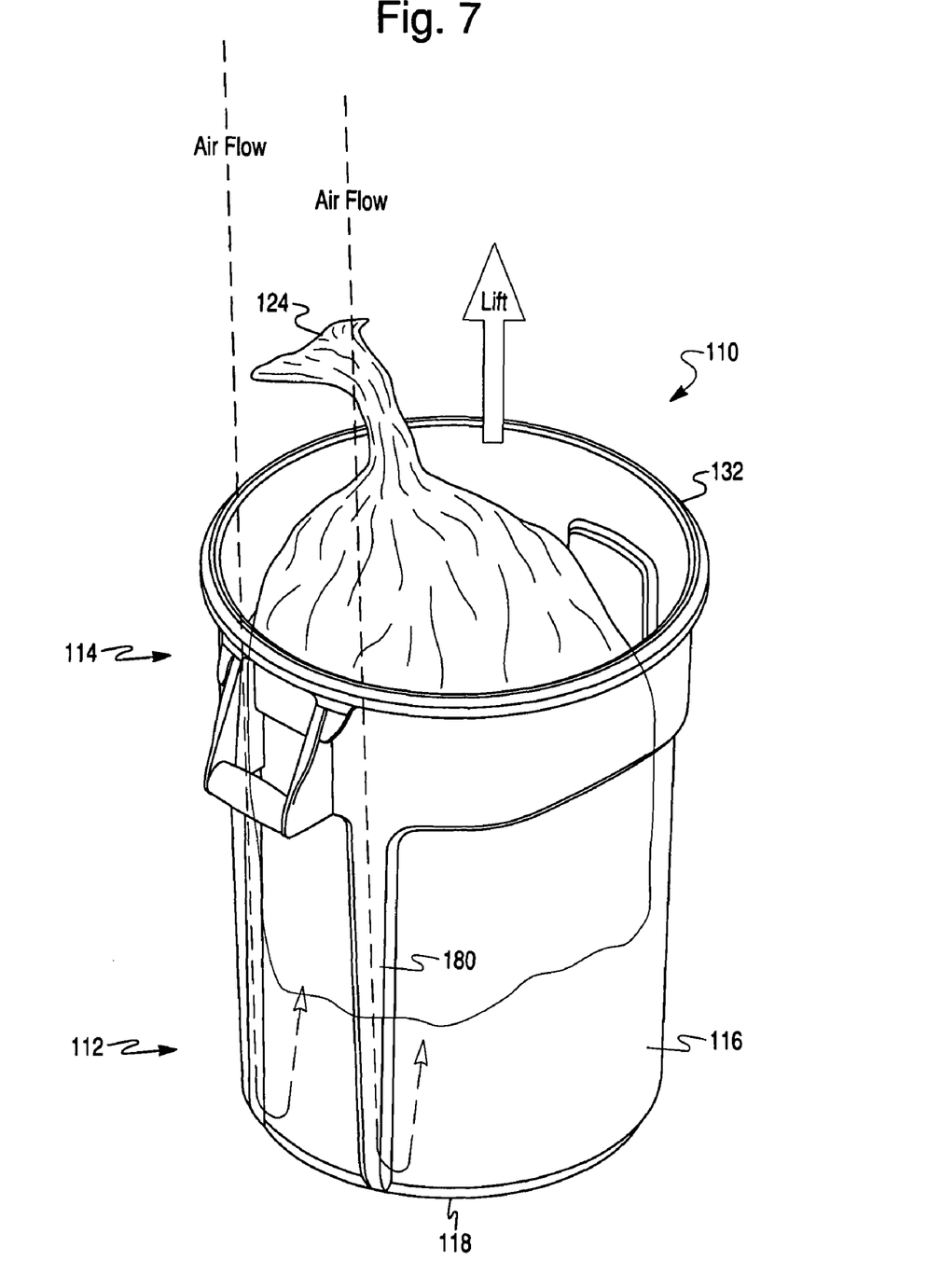
FIG. 7 is a perspective view of a preferred embodiment of a receptacle according to the present invention.
Figure 8:
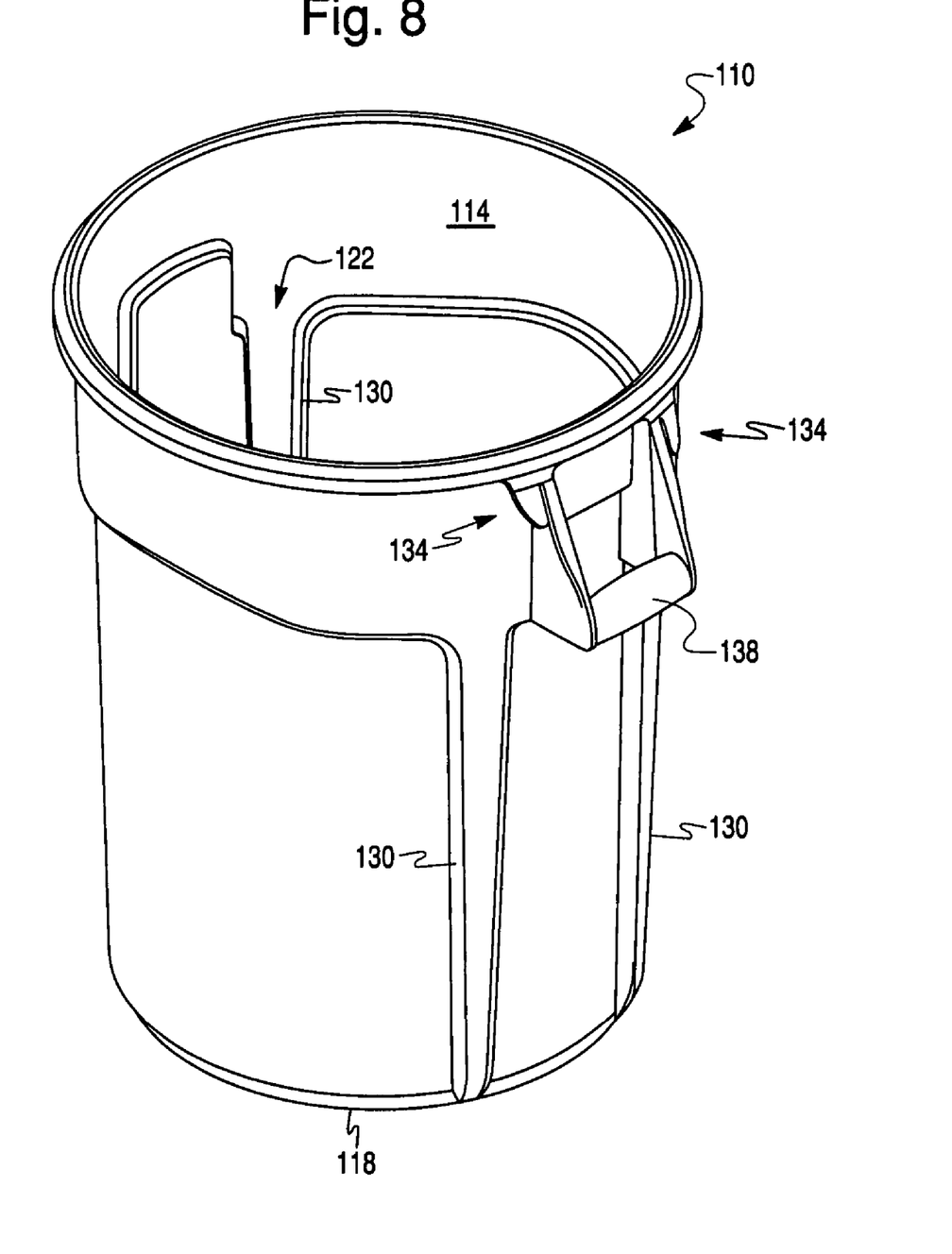
FIG. 8 is a perspective view of the receptacle of FIG. 7.

In another exemplary embodiment a method of using a receptacle with a liner is provided (as shown in FIGS. 1 and 7). The steps of the method include: pulling the liner 24, 124 from a first chamber section 12, 112 of the receptacle 10, 110 that is configured to receive items, the first chamber section having a bottom wall 18, 118 and a first side wall 16, 116 with a vent 22, 122; and pulling the liner from a second chamber section 14, 114 of the receptacle that is located above the first chamber section. The second chamber section 14, 114 has a second side wall 20, 120 and an internal width (w2, w4) that is wider than an internal width of the first chamber section (w1, w3). The liner 24, 124 is pulled from the first chamber section 12, 112 such that the vent 22, 122 provides fluid communication between the second chamber section 14, 114 and a bottom area of the first chamber section 12, 112. The liner 24, 124 may be pulled from the receptacle 10, 110 by bunching the liner together at the top of the liner or pulling on a number of corners of the liner together and pulling upward.

Other embodiments of the invention will be apparent to those skilled in the art from consideration of the specification and practice of the invention disclosed herein. It is intended that the specification and examples be considered as exemplary only. It will be apparent to those skilled in the art that various modifications and variations can be made to the present receptacles without departing from the spirit and scope of the invention. For example, while the illustrated embodiments show a liner fitting within a receptacle, another embodiment includes boxes having dense materials, e.g., books, that are packaged in a confined space. As a further example, the receptacle may be useful in any situation in which an object or objects in the receptacle either themselves essentially form a seal with the side wall of the receptacle or a container holding the object or objects forms such a seal, such that in the absence of the vents ventilation could not reach the bottom of the receptacle. Thus, it is intended that the present receptacle cover the modifications and variations of this invention provided they come within the scope of the appended claims and their equivalents.

What is claimed is:

1. A receptacle, comprising:
   a first chamber section configured to receive items, the first chamber section having a first side wall and a bottom wall;
   a second chamber section located above the first chamber section, wherein the second chamber section has a second side wall and an internal width that is wider than an internal width of the first chamber section; and
   a vent providing fluid communication between the second chamber section and a bottom area of the first chamber section,
   wherein the vent is formed by first, second, third, and fourth outward protrusions along an outer periphery of the first side wall and each protrusion includes two side surfaces,
   wherein each outward protrusion has an internal width between the two side surfaces ranging from about 1 inch to about 3.5 inches and a depth ranging from about 0.25 inches to about 0.90 inches,
   wherein the first side wall includes a first side wall portion between the first and second protrusions, a second side wall portion between the second and third protrusions, a third side wall portion between the third and fourth protrusions, and a fourth side wall portion between the fourth and first protrusions,
   wherein a distance along the first side wall portion between the first and second protrusions and a distance along the third side wall portion between the third and fourth protrusions are both greater than a distance along the second side wall portion between the second and third protrusions and a distance along the fourth side wall portion between the fourth and first protrusions, and
   wherein no other outward protrusions are formed along the first side wall portion between the first and second protrusions and along the third side wall portion between the third and fourth protrusions.

2. The receptacle of claim 1, wherein the first side wall forms a substantially circular cross-sectional shape with a first radius, and the second side wall forms a substantially circular cross-sectional shape with a second radius that is larger than the first radius.

3. The receptacle of claim 1, wherein the first side wall forms a substantially rectangular cross-sectional shape with a first width, and the second side wall forms a substantially rectangular cross-sectional shape with a second width that is larger than the first width.

4. The receptacle of claim 1, wherein the internal width of each outward protrusion is variable and ranges from about 1 inch to about 2 inches at a bottom of the respective outward protrusion to about 2.0 inches to about 3.5 inches at a top of the respective outward protrusion.

5. The receptacle of claim 1, wherein the internal width of each outward protrusion is variable, each outward protrusion being wider at one end of the first chamber section than at another end of the first chamber section.

6. The receptacle of claim 1, wherein the first side wall forms a substantially rectangular cross-sectional shape, each outward protrusion being disposed at a corner of the cross-sectional shape.

7. The receptacle of claim 1, wherein the receptacle is configured to receive at least 50% of a substantially similarly shaped receptacle in a vertical direction in a nesting relationship.

8. The receptacle of claim 1, wherein no other outward protrusions are formed along the second side wall portion between the second and third protrusions and along the fourth side wall portion between the fourth and first protrusions.

9. A receptacle configured to receive a liner, comprising:
   a bottom wall;
   a first chamber section at least partially defined by the bottom wall and a side wall;
   a second chamber section superjacent the first chamber section and at least partially defined by the side wall and a rim; and
   a vent configured to reduce negative pressure in the first chamber section as the liner is filled and/or removed from the receptacle;
   wherein the second chamber section has a wider internal width than an internal width of the first chamber section,
   wherein the vent is formed by first, second, third, and fourth outward protrusions along an outer periphery of the side wall and each protrusion includes two side surfaces,
   wherein each outward protrusion has an internal width between the two side surfaces ranging from about 1 inch to about 3.5 inches and a depth ranging from about 0.25 inches to about 0.90 inches,
   wherein the side wall includes a first side wall portion between the first and second protrusions, a second side wall portion between the second and third protrusions, a third side wall portion between the third and fourth protrusions, and a fourth side wall portion between the fourth and first protrusions,
   wherein a distance along the first side wall portion between the first and second protrusions and a distance along the third side wall portion between the third and fourth protrusions are both greater than a distance along the second side wall portion between the second and third protrusions and a distance along the fourth side wall portion between the fourth and first protrusions, and wherein no other outward protrusions are formed along the first side wall portion between the first and second protrusions and along the third side wall portion between the third and fourth protrusions.

10. The receptacle of claim 9, wherein the side wall at the first chamber section forms a substantially circular cross-sectional shape with a first radius, and the side wall at the second chamber section forms a substantially circular cross-sectional shape with a second radius that is larger than the first radius.

11. The receptacle of claim 9, wherein the side wall at the first chamber section forms a substantially rectangular cross-sectional shape with a first width, and the side wall at the second chamber section forms a substantially rectangular cross-sectional shape with a second width that is larger than the first width.

12. The receptacle of claim 9, wherein the internal width of each outward protrusion is variable and ranges from about 1 inch to about 2 inches at a bottom of the respective outward protrusion to about 2.0 inches to about 3.5 inches at a top of the respective outward protrusion.

13. The receptacle of claim 9, wherein the internal width of each outward protrusion is variable, each outward protrusion being wider at one end of the first chamber section than at another end of the first chamber section.

14. The receptacle of claim 9, wherein the side wall at the first chamber section forms a substantially rectangular cross-sectional shape, each outward protrusion being disposed at a corner of the cross-sectional shape.

15. The receptacle of claim 9, wherein no other outward protrusions are formed along the second side wall portion between the second and third protrusions and along the fourth side wall portion between the fourth and first protrusions.

16. The receptacle of claim 9, wherein the receptacle is configured to receive at least 50% of a substantially similarly shaped receptacle in a vertical direction in a nesting relationship.

17. A method of using a receptacle with a liner, comprising:
pulling the liner from a first chamber section of the receptacle that is configured to receive items, the first chamber section having a bottom wall and a first side wall with a vent; and
pulling the liner from a second chamber section of the receptacle that is located above the first chamber section, wherein the second chamber section has a second side wall and an internal width that is wider than an internal width of the first chamber section;
wherein the liner is pulled from the first chamber section such that the vent provides fluid communication between the second chamber section and a bottom area of the first chamber section, wherein the vent is formed by first, second, third, and fourth outward protrusions along an outer periphery of the first side wall and each protrusion includes two side surfaces, and wherein each outward protrusion has an internal width between the two side surfaces ranging from about 1 inch to about 3.5 inches and a depth of about 0.25 inches to about 0.90 inches, wherein the first side wall includes a first side wall portion between the first and second protrusions, a second side wall portion between the second and third protrusions, a third side wall portion between the third and fourth protrusions, and a fourth side wall portion between the fourth and first protrusions, wherein a distance along the first side wall portion between the first and second protrusions and a distance along the third side wall portion between the third and fourth protrusions are both greater than a distance along the second side wall portion between the second and third protrusions and a distance along the fourth side wall portion between the fourth and first protrusions, and wherein no other outward protrusions are formed along the first side wall portion between the first and second protrusions and along the third side wall portion between the third and fourth protrusions.

18. The receptacle of claim 1, wherein the first side wall forms a substantially rectangular cross-sectional shape, each outward protrusion being disposed at a corner of the cross-sectional shape such that one of the two side surfaces of the respective outward protrusion protrudes outwardly from one side of the rectangular cross-sectional shape and the other of the two side surfaces of the respective outward protrusion protrudes outwardly from another side of the rectangular cross-sectional shape that is perpendicular to the one side.

19. The receptacle of claim 1, wherein each of the two side surfaces of each outward protrusion protrudes perpendicularly outward from the first side wall at a location where the respective side surface connects to the first side wall.

20. The method of claim 17, wherein internal width of each outward protrusion is variable and ranges from about 1 inch to about 2 inches at a bottom of the respective outward protrusion to about 2.0 inches to about 3.5 inches at a top of the respective outward protrusion.

21. The method of claim 17, wherein no other outward protrusions are formed along the second side wall portion between the second and third protrusions and along the fourth side wall portion between the fourth and first protrusions.

* * * * *